United States Patent [19]
Meagher

[11] 3,909,045
[45] Sept. 30, 1975

[54] TUBING JOINT FOR ADHESIVE BONDING

[75] Inventor: George L. Meagher, Morrisville, Pa.

[73] Assignee: General Electric Company, Louisville, Ky.

[22] Filed: Oct. 10, 1974

[21] Appl. No.: 513,838

[52] U.S. Cl. ............ 285/22; 285/374; 285/DIG. 16
[51] Int. Cl.² ......................................... F16L 13/00
[58] Field of Search ........ 285/21, 22, DIG. 16, 374, 285/384; 29/473.3, 474.3, 474.4

[56] References Cited
UNITED STATES PATENTS

| | | | |
|---|---|---|---|
| 2,322,587 | 6/1943 | Payne | 285/DIG. 16 |
| 2,825,587 | 3/1958 | Borta et al. | 285/DIG. 16 |
| 3,210,102 | 10/1965 | Joslin | 285/DIG. 16 |
| 3,269,743 | 8/1966 | Barrelu | 285/DIG. 16 |
| 3,734,684 | 5/1973 | Donaldson et al. | 8/183 |
| 3,737,284 | 6/1973 | O'Brien et al. | 8/183 |
| 3,745,191 | 7/1973 | Daigle et al. | 260/606.5 P |
| 3,784,235 | 1/1974 | Kessler | 285/DIG. 16 |

*Primary Examiner*—Dave W. Arola

[57] ABSTRACT

A tube joint configuration for use with adhesive that includes a female member having a retaining area and a male member having a piston means for applying pressure to the adhesive during telescoping of the members to hydraulically force the adhesive into the retaining area to eliminate voids and provide a leak-tight joint. The female member is provided with axially spaced flanges at each end of the retaining area that are adapted to be engaged when the members are fully telescoped by a mating surface on the free end of the male member and by the piston means to seal the void-free adhesive in the retaining area.

3 Claims, 4 Drawing Figures

TUBING JOINT FOR ADHESIVE BONDING

BACKGROUND OF THE INVENTION

1. Field of the Invention

This invention relates generally to a joint for adhesively connecting male and female tube members and more specifically to a joint wherein the adhesive is hydraulically forced between the members during telescoping of the members to prevent voids in the adhesive. In the present embodiment the male member is provided with a projection that functions to force the adhesive into a retaining area disposed between the two members. The end of the male member engages a complimentary surface on the female member to seal one end of the retaining area while the projection engages a second flange on the female member to seal the other end of the retaining area to maintain an appropriate amount of adhesive in the retaining area to insure a leak-tight seal between tube members.

2. Description of the Prior Art

In the fabrication of tube joints employing adhesive as a sealing medium it has been customary to shape or form one tube element relative to the other. This has been necessary to insure the integrity of the joint and to provide a leak-free joint over a wide range of tolerances. For instance, U.S. Pat. Nos. 3,124,874 - Woolley and 3,068,563 - Reverman are examples of prior art approaches employing steps for shaping or forming the tube members after they are telescoped together. This shaping or forming process requires a substantial investment in manufacturing equipment and the additional time necessary to carry out the operation. In the fabrication of heat exchange assemblies including many passes and reverse turns several joints may be located in close proximity to each other, thus making the shaping and forming operations impractical in that the space requirements are not available.

SUMMARY OF THE INVENTION

By the present invention a tube joint comprises a first tube having an end portion adapted to receive an adhesive coated end portion of a second tube with radial clearance between contiguous sealing surfaces of the two tubes providing a retaining area for said adhesive. The first tube includes a first annular flange that provides an enlarged cross-sectional area forming one of the sealing surfaces and a second axially spaced annular flange providing a second enlarged area forming a guide surface. Guide means projecting from the second tube is adapted to engage and force the adhesive into the retaining area during telescoping of the numbers to eliminate voids in the adhesive. The guide means is located axially on the second tube so as to engage the second flange to seal one end of the retaining area while mating means on the free end of the second tube engages the first flange of the first tube to seal the opposite end of the retaining area when the tubes are telescoped.

DESCRIPTION OF THE PREFERRED EMBODIMENT

Figure 1:
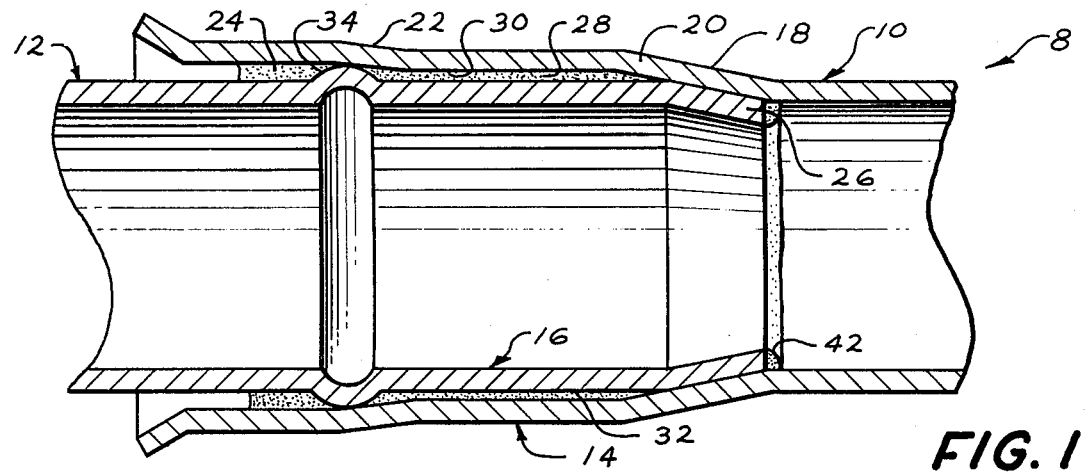
FIG. 1 is an elevational view in section illustrating a completed tube joint formed in accordance with the invention.

Referring now to the drawings, a female tube 10 and male tube 12 to be adhesively joined together to form the joint 8 of the present invention are in the present instance fabricated from aluminum. It should be noted that tubes made from other materials may be employed. Tube 10 is provided with an enlarged end portion 14 which is adapted to receive an end portion 16 of the male tube 12. The enlarged end portion 14 forming the receiving area for the end portion 16 includes a first annular outwardly projecting flange 18 which provides a cross-sectional enlargement 20. Spaced axially or longitudinally from the flange 18 is a second flange or outwardly projecting section 22 which provides a second cross-sectional enlargement 24.

Referring to FIG. 1 it will be seen that an adhesive retaining area 28 is provided between the inner wall 30 of the enlargement 20 and the outer wall 32 of the tube end 16.

In accordance with one feature of the present invention, means are provided for sealing or closing off the retaining area 28 when the tubes 10 and 12 are telescoped, as shown in FIG. 1. In order to accomplish the sealing of area 28 the tube end portion 16 of male tube 12 has formed on its free end an inwardly disposed flange 26 having a size and shape conforming to the inner circumferentially disposed wall of flange 18. Spaced axially or longitudinally from the flange 26 is an outwardly projecting guide or annular bead portion 34 engaging the inner circumferentially disposed wall of flange 22. It should be readily understood that the flange 26 and bead 34 are spaced and dimensioned so that they engage the flanges 18 and 22 respectively to seal the retaining area 28 simultaneously when the tubes are in their fully telescoped position, as shown in FIG. 1.

Figure 2:
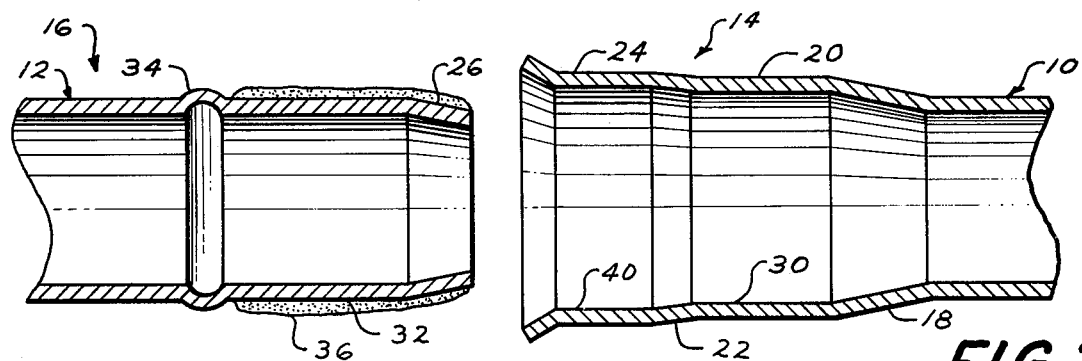
FIG. 2 is a sectional view showing the tubes prior to their assembly.

In assemblying or fabricating the joint 8 prior to insertion of the end portion 16 of tube 12 into the enlarged section 14 of tube 10, the surface or wall 32 of the portion 16 is thickly coated with the desired adhesive 36 from the flange 26 to the projection or bead 34 as indicated in FIG. 2. The amount of adhesive 36 when applied to effectively carry out the invention must have a volume somewhat greater than the volume of the retaining area 28. While it is possible that many types of adhesive may be employed to provide an effective seal between metal tubes, for the purpose of forming joints in accordance with this invention one of the heat curable epoxy resins has been employed, more specifically one manufactured by the 3M Company and identified as EC2214HT.

Means are also provided by the present invention to hydraulically force the adhesive 36 into the retaining area 28 in a manner that effectively eliminates voids in the adhesive 36 located in the retaining area 28 of the completed joint shown in FIG. 1.

Figure 3:
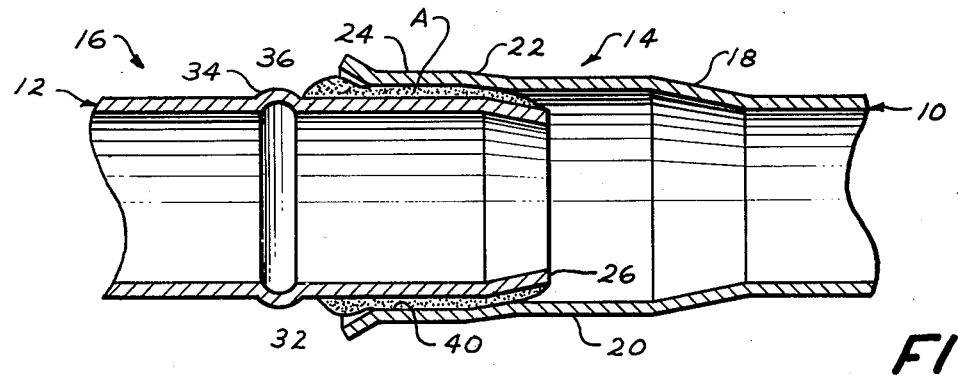
FIG. 3 is a sectional view showing the tube ends partially telescoped.

Referring to FIG. 3 as the male end 16 is inserted into the female end or enlargement 14 the adhesive 36 applied to end portion 16 is captured within or below the bead 34 on the wall 32 of end 16. It should be noted that the radial clearance indicated at 38 between the bead 34 and the inner wall surface 40 of section 24 is substantially less than the radial clearance of retaining area 28.

Figure 4:
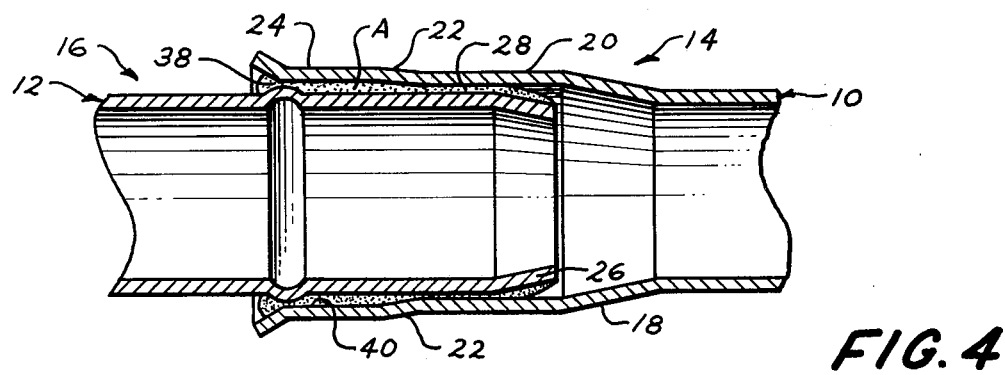
FIG. 4 is a sectional view showing the tube end in another partially telescoped position.

Volume A as indicated in FIG. 3 collects a substantial amount of adhesive as the male end 16 is inserted. Referring to FIG. 4, as the male end 16 is inserted further into the end 14 the adhesive 36 within Volume A is put under compressive forces as the bead 34 continues into the open end portion 14 of the tube 10. The adhesive 36 is thereby forced longitudinally toward the bead 34 of tube end 16 as the telescoping of the joint increases or continues. It should be noted that Volume A reduces faster than the volume of the retaining area 28 increases and as a result the adhesive 36 in Volume A is hydraulically forced into the retaining area 28 at a rate faster than the telescoping rate of the end portions 14 and 16 of tubes 10 and 12 respectively. The above described tube configurations and hydraulic action effectively removes entrapped air or voids from the adhesive 36 as it is being forced into the retaining area. When the joint insertion is complete as shown in FIG. 1 the thickness of the adhesive 36 in the mating area of flange 26 is substantially zero and the adhesive 36 collected on flange 26 is forced out around the end of the male tube to form a filet or bead 42 around the circumference of the end of the tube end 16 providing a seal on the inner or one end of the retaining area 28. Excessive adhesive contained in Volume A just prior to the completion of the insertion is forced through clearance 38 between the wall 400 and the bead 34 prior to the engagement of the bead 34 with the flange 22 to form a second filet 44 on the outer or other end of the retaining area 28 and another seal around the bead 34 as indicated in FIG. 1.

Bead 34 has an additional function in that it provides for axially aligning the tubes during the insertion process. In effect, it maintains the axis of both tubes concentric and in effect insures the radial clearance of the retaining area 28. From the above description it should be apparent that the hydraulic force imparted by the bead 34 on the adhesive 36 during telescoping of the members is effective in eliminating voids in the adhesive.

After the tube members have been telescoped and the joint configuration completed as shown in FIG. 1, the assembled tubes are heated to cure the epoxy.

The joint of the present invention provides sealing at three points in the joint; that is, at the retaining area 28, at the contact area of flanges 18 and 26, and at the contact area of bead 34 and flange 22. It should also be understood that the contact between flange 18 and 26 at one end of the retaining area 28 and the contact between bead 34 and flange 22 at the other end of the retaining area provide axial stability between the tube. This stability is especially helpful prior to the heat curing of the epoxy.

While there has been shown and described a specific embodiment of the invention, it will be understood that it is not limited thereto and it is intended by the appended claims to cover all such modifications as fall within the true spirit and scope of the invention.

What is claimed is:

1. A tube joint comprising a first tube having an end portion receiving an adhesive coated end portion of a second tube with radial clearance between contiguous sealing surfaces of the two tubes providing a retaining area for said adhesive:

a first annular outwardly projecting flange on said first tube providing an enlarged cross-sectional area forming one of said sealing surfaces, and a second annular flange projecting outwardly relative to said first flange and spaced axially from said first flange providing a second enlarged cross-sectional area forming a guide surface;

guide means on said second tube end portion projecting radially outwardly into said second enlarged cross-sectional area engaging and forcing said adhesive into said retaining area during telescoping of said members to eliminate voids in said adhesive, said guide means being in direct sealing engagement with said second flange thereby sealing one end of said retaining area; and mating means on the free end of said second tube end portion being in direct sealing engagement with said first flange thereby sealing the other end of said retaining area.

2. The invention set forth in claim 1 wherein the radial clearance between said guide means on said guide surface is greater than the radial clearance between said sealing surface so that the adhesive is hydraulically forced into said retaining area.

3. The invention as set forth in claim 2 wherein the volume of adhesive is sufficient to allow adhesive to escape past said guide means as said mating means seals against said first flange.

* * * * *